(12) United States Patent
Criado-Perez et al.

(10) Patent No.: US 11,176,383 B2
(45) Date of Patent: Nov. 16, 2021

(54) HAZARD DETECTION THROUGH COMPUTER VISION

(71) Applicant: American International Group, Inc., New York, NY (US)

(72) Inventors: Pablo Criado-Perez, New York, NY (US); Sheri Wilbanks, Repulse Bay (HK)

(73) Assignee: AMERICAN INTERNATIONAL GROUP, INC., New York, NY (US)

(*) Notice: Subject to any disclaimer, the term of this patent is extended or adjusted under 35 U.S.C. 154(b) by 0 days.

(21) Appl. No.: 16/442,079

(22) Filed: Jun. 14, 2019

(65) Prior Publication Data

US 2019/0385430 A1 Dec. 19, 2019

Related U.S. Application Data

(60) Provisional application No. 62/685,433, filed on Jun. 15, 2018.

(51) Int. Cl.
| | |
|---|---|
| *G06K 9/00* | (2006.01) |
| *G08B 21/02* | (2006.01) |
| *G08B 5/36* | (2006.01) |
| *G06K 9/62* | (2006.01) |
| *G08B 13/196* | (2006.01) |
| *G06K 9/46* | (2006.01) |
| *G06K 9/34* | (2006.01) |
| *G06T 7/143* | (2017.01) |
| *G06N 7/00* | (2006.01) |

(52) U.S. Cl.
CPC ..... *G06K 9/00771* (2013.01); *G06K 9/00718* (2013.01); *G06K 9/34* (2013.01); *G06K 9/4638* (2013.01); *G06K 9/6226* (2013.01); *G06K 9/6254* (2013.01); *G06K 9/6256* (2013.01); *G06K 9/6277* (2013.01); *G06K 9/6278* (2013.01); *G06K 9/6284* (2013.01); *G06K 9/6296* (2013.01); *G06K 9/6297* (2013.01); *G08B 5/36* (2013.01); *G08B 13/196* (2013.01); *G08B 13/19613* (2013.01); *G08B 21/02* (2013.01); *G06K 2009/00738* (2013.01); *G06N 7/005* (2013.01); *G06T 7/143* (2017.01); *G08B 13/19615* (2013.01)

(58) Field of Classification Search
CPC ............. G06K 9/00771; G06K 9/6277; G06K 9/6297; G06K 9/6296; G06K 9/6278; G06K 9/6226; G06K 9/4638; G06K 9/34; G08B 13/196; G08B 13/19613; G08B 13/19615; G06T 7/143; G06N 7/005
See application file for complete search history.

(56) References Cited

U.S. PATENT DOCUMENTS

| | | | |
|---|---|---|---|
| 8,520,072 B1* | 8/2013 | Slavin | H04N 7/183 348/156 |
| 10,096,219 B1* | 10/2018 | Maurer | G08B 13/1427 |

(Continued)

*Primary Examiner* — David N Werner
(74) *Attorney, Agent, or Firm* — Snell & Wilmer L.L.P.; Lisa M. Knight

(57) ABSTRACT

Systems and methods for detecting a hazard in a facility include the use of one or more cameras coupled with a hazard detection server. The hazard detection server is adapted to analyze images from the cameras, determine probabilities of hazards being present in the images, and provide an alert to a manager or workers when the probabilities exceed a hazard threshold.

27 Claims, 5 Drawing Sheets

(56) References Cited

U.S. PATENT DOCUMENTS

| | | | |
|---|---|---|---|
| 10,507,793 B1* | 12/2019 | De Moura Partika | B60R 25/102 |
| 2006/0045354 A1* | 3/2006 | Hanna | G08B 13/19613 |
| | | | 382/224 |
| 2007/0122003 A1* | 5/2007 | Dobkin | G08B 13/19645 |
| | | | 382/115 |
| 2015/0287302 A1* | 10/2015 | Ruess | G08B 13/19656 |
| | | | 348/143 |
| 2015/0356840 A1* | 12/2015 | Wang | G08B 13/19682 |
| | | | 382/103 |
| 2016/0093338 A1* | 3/2016 | Laska | G06F 3/0481 |
| | | | 386/224 |
| 2016/0149720 A1* | 5/2016 | Hatae | G08B 13/08 |
| | | | 455/414.1 |
| 2016/0275375 A1* | 9/2016 | Kant | G06K 9/6218 |
| 2016/0300465 A1* | 10/2016 | Britton | G08B 13/19669 |
| 2017/0085839 A1* | 3/2017 | Valdhorn | G08B 13/19613 |
| 2017/0355081 A1* | 12/2017 | Fisher | H04N 5/33 |
| 2017/0371339 A1* | 12/2017 | Charette | G05D 1/0088 |
| 2018/0114422 A1* | 4/2018 | Wiechers | G08B 13/19647 |
| 2018/0153457 A1* | 6/2018 | Montoya | G08B 13/19641 |
| 2018/0182053 A1* | 6/2018 | Casatejada Herrera | H04N 5/2256 |
| 2018/0253597 A1* | 9/2018 | Kozakaya | G08B 13/196 |
| 2018/0285653 A1* | 10/2018 | Li | G06K 9/00335 |
| 2018/0357870 A1* | 12/2018 | Siminoff | G08B 13/19671 |
| 2019/0004484 A1* | 1/2019 | Cussonneau | G05B 13/041 |
| 2019/0138830 A1* | 5/2019 | Justice | G06K 9/00771 |
| 2019/0180153 A1* | 6/2019 | Buckler | G06K 9/00147 |
| 2019/0318288 A1* | 10/2019 | Noskov | G06N 20/00 |
| 2020/0074078 A1* | 3/2020 | Saxe | G06N 5/046 |
| 2021/0241141 A1* | 8/2021 | Dugger | H04L 41/14 |

\* cited by examiner

HAZARD DETECTION THROUGH COMPUTER VISION

CROSS-REFERENCE TO RELATED APPLICATIONS

This patent application claims the benefit of priority to U.S. Patent Application No. 62/685,433, filed Jun. 15, 2018, and entitled "Hazard Detection through Computer Vision," which application is incorporated in its entirety herein by this reference.

TECHNICAL FIELD

This patent disclosure relates, generally, to systems and methods for detecting hazards in a facility and, more particularly, to such systems and methods having features and techniques for reducing the occurrence of slippery floor conditions and obstructed doorways and hallways within a facility.

BACKGROUND

According to the Centers for Disease Control and Prevention (CDC), in 2015, costs for slip-and-fall accidents to Medicare alone totaled over $31 billion. This total does not include legal or non-Medicare related costs. The total expense resulting from slip-and-fall injuries in the United States is estimated to be approximately $100 million per day. According to the CDC, in 2008 more than 8.5 million Americans sustained injuries from an unintentional slip or fall—the leading cause of all nonfatal injuries treated in U.S. hospital emergency rooms. Common causes of slip-and-fall accidents include improper maintenance of walking and common areas, wet surfaces, and obstructed paths in common areas.

Slip and fall injuries are frequently associated with wet floors. Customers typically encounter such wet floors in the restroom of a facility, and employees frequently encounter such wet surfaces in a work area, such as a kitchen of a restaurant, for example. These injuries can result in numerous general liability and/or workers compensation claims.

Conventional techniques for evaluating hazardous conditions in a facility are complicated and expensive and are prone to human error. The cost and the effort involved in evaluating these conditions reduce the frequency of safety checks. This results in fewer safety readings being taken and a lack of alerts when dangerous conditions exist.

Slips and falls from the same height account for nearly twenty percent of U.S. worker injuries and as much as forty percent of restaurant general liability claims. There is a continued need in the art to provide additional solutions to help promote safety in facilities used by the public and to reduce the occurrence of slip-and-fall injuries. For example, there is a continued need for techniques for improving the ability to monitor hazardous conditions within a facility.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

This disclosure is directed to embodiments of systems and methods for detecting hazards in a facility. The computer-implemented architecture provided can include a non-transitory computer-readable medium including a hazard detection program constructed to analyze a digital image from an imaging device, determine a probability of a hazard condition being present in the image, and transmit an electronic alert when the probability exceeds a hazard threshold.

In one aspect, embodiments of a system for detecting a hazard at a location site are disclosed. In one embodiment, a system for detecting a hazard at a location site includes an imaging device, a non-transitory computer-readable medium having stored thereon a hazard detection program, and a processor.

The imaging device is configured to generate a digital image of a region of the location site. The processor is in operable arrangement with the camera to receive the digital image therefrom and is in operable arrangement with the non-transitory computer-readable medium. The processor is configured to execute the hazard detection program contained on the non-transitory computer-readable medium.

The hazard detection program includes an imaging processor module configured to analyze the digital image from the imaging device to determine whether a hazard condition is present in the digital image by determining a probability that an object is present in the digital image. The probability is calculated via a machine learning module. The hazard detection program includes a notification module configured, in response to the imaging processor module determining the probability exceeds a threshold, to send an electronic alert message to at least one recipient. The electronic alert message is configured to alert the recipient that the hazard condition is present at the location site according to the digital image.

In another embodiment, a system includes an imaging device and a processor. The imaging device is configured to generate a digital image of at least a region of a site location. The processor is in operable arrangement with the imaging device to receive the digital image therefrom.

The processor is programmed to perform image processing on the digital image to identify an object in the digital image via a machine learning module. The processor is programmed to determine a hazard probability that the object in the digital image satisfies a hazard condition. The processor is programmed, in response to determining the hazard probability exceeds a threshold value, to send an electronic alert message to at least one recipient, the electronic alert message configured to alert the recipient that the hazard condition is present at the location site according to the digital image.

In another aspect, embodiments of a method of detecting a hazard in a facility are disclosed. In one embodiment, a method of detecting a hazard at a location site includes receiving, at a processor over an electronic network, a digital image of a region of the location site. The processor is used to execute computer executable instructions stored on a non-transitory computer-readable medium. The instructions cause the processor to perform image processing on the digital image to identify an object in the digital image via a machine learning module, determine a hazard probability that the object in the digital image satisfies a hazard condition, and, in response to determining the hazard probability exceeds a threshold value, transmit an electronic alert message over the electronic network to at least one recipient. The electronic alert message is configured to alert the recipient that the hazard condition is present at the location site according to the digital image.

Further and alternative aspects and features of the disclosed principles will be appreciated from the following detailed description and the accompanying drawings. As will be appreciated, the principles relating to detecting hazardous conditions in a facility disclosed herein are capable of being carried out in other and different embodiments, and capable of being modified in various respects. Accordingly, it is to be understood that both the foregoing general description and the following detailed description are exemplary and explanatory only and do not restrict the scope of the principles disclosed herein.

DETAILED DESCRIPTION

Figure 1:
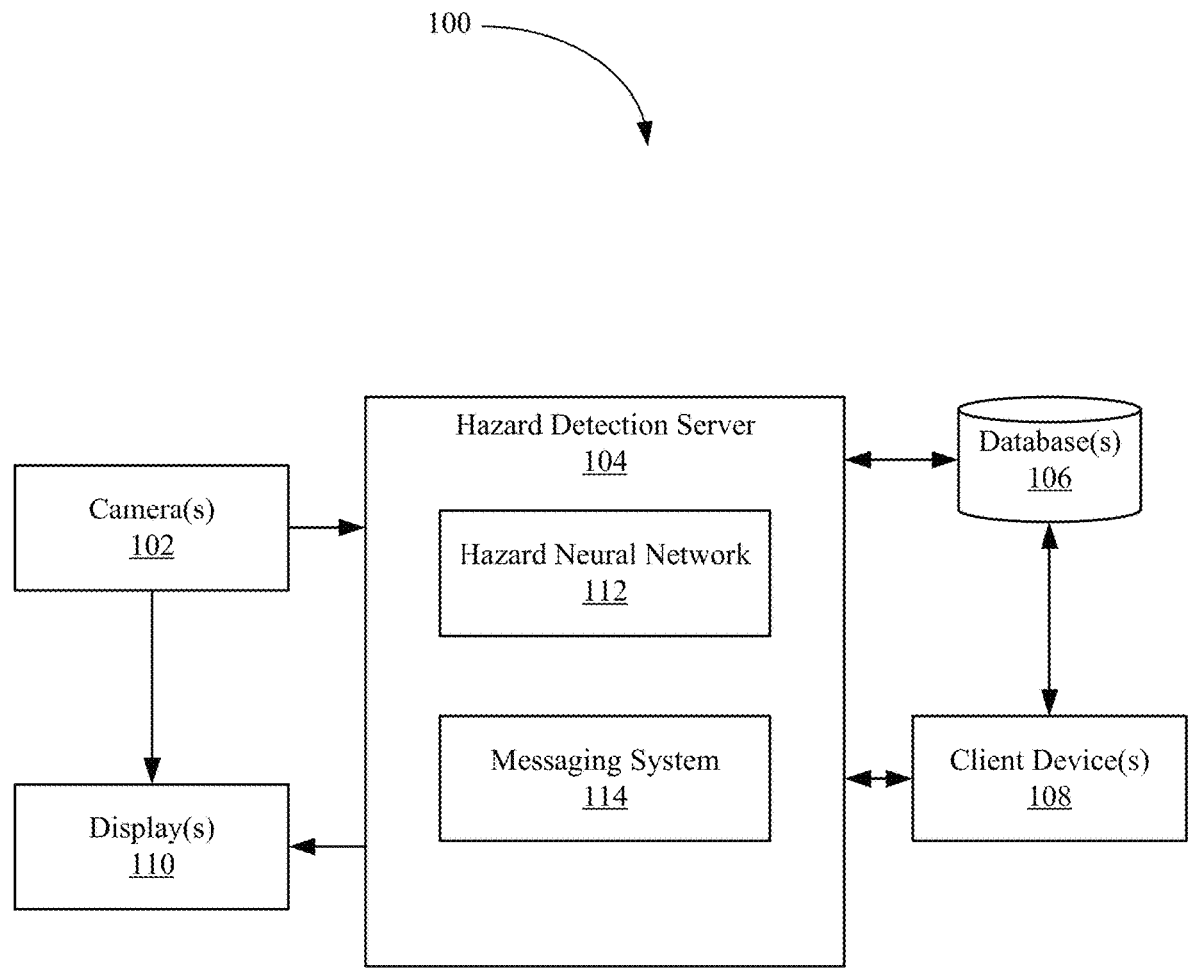
FIG. 1 is a system for hazard detection according to an embodiment of the present disclosure.

Embodiments of systems and methods for detecting hazards in a facility are described herein. Embodiments of the disclosure provide systems and methods that apply computer vision and image processing to images of a facility to determine whether a hazard condition exists, thus automating the safety monitoring process. Embodiments of the disclosure provide systems and methods that identify at a location site (such as, retail/restaurant/hospitality spaces, for example) "objects" that could pose a hazard for workers and/or guests, automatically detect when such hazardous condition exists with predictive analytics using machine learning, and automatically issue an electronic alert to at least one recipient according to a notification protocol that identifies the condition(s) posing a hazard based upon the predictive analytics.

Embodiments of systems and methods for detecting hazardous conditions in a facility constructed according to principles of the present disclosure can be used to improve safety within the facility and reduce the occurrence of accidents caused by poor floor conditions, obstruction of safety equipment or evacuation routes, and/or missing safety equipment (e.g., a fire extinguisher missing from its designated location or personal protective equipment (PPE) missing on someone at the facility). Embodiments of systems and methods for detecting hazardous conditions in a facility following principles of the present disclosure can be used to improve safety at the facility by monitoring for slip and trip hazards, obstruction of safety equipment or evacuation routes, and/or missing safety equipment according to a predetermined schedule and/or on a continuous manner.

Embodiments of systems and methods for detecting hazardous conditions in a facility following principles of the present disclosure can result in slip reduction via a hazard detection server that automatically reports the occurrence of a detected hazard condition, such as slip and trip hazards, obstruction of safety equipment or evacuation routes, and/or missing safety equipment. Hazard detection data records can be transmitted and stored in a cloud-based platform allowing for improved safety at a facility and better management of safety conditions, as a result. Continuous hazard monitoring can provide more accurate records and reduce the occurrence of accidents at the facility. By obtaining hazardous conditions data more frequently and/or on a substantially continuous basis, a manager can respond faster to detected hazardous conditions that require attention and implement remedial measures to help reduce the occurrence of such hazardous conditions in the future.

Embodiments of a system for detecting hazardous conditions in a facility following principles of the present disclosure can be used to track location(s) within the facility prone to having hazard conditions. Embodiments of a system for detecting hazardous conditions in a facility following principles of the present disclosure can be used to alert a manager when a detected hazard has not been cleared within a given time and/or within a given area of the facility.

Embodiments of a system for detecting hazardous conditions of a facility following principles of the present disclosure can include a central, cloud-based management system for analysis of the conditions of a given facility or over a number of different facilities within a designated region. Embodiments of a system for detecting hazardous conditions of a facility following principles of the present disclosure can include a suitable data storage system for storing detailed hazardous conditions data logs for a given facility to track trends and monitor the hazardous conditions of the facility against a historical trajectory.

The Figures show a number of different embodiments of systems and methods for detecting hazardous conditions in a facility according to principles of the present disclosure. The systems and methods can be used to identify hazard conditions and forewarn following an established notification protocol at least one recipient (e.g., a manager of the location site) of the hazardous condition(s) prior to an injury or loss actually occurring.

FIG. 1 is a system 100 for hazard detection according to an embodiment of the present disclosure. The system 100 can include one or more imaging devices in the form of cameras 102, a hazard detection server 104, one or more databases 106, one or more client devices 108, and one or more displays 110. The one or more cameras 102 can be deployed throughout a location site, e.g., a hospital, a restaurant, retail space, etc. The cameras 102 are configured to generate a digital image comprising digital video and/or image data at specific locations based on their physical location within the facility. In embodiments, the cameras 102 can provide the videos and/or images to the displays 110 for viewing.

In embodiments, the cameras 102 include one or more infrared cameras configured to detect infrared energy (heat) and to generate thermal image data for a thermal image. The thermal image can be used to help determine whether a hazard condition exists that comprises a fluid leak or spill and/or a wet floor surface creating a slip hazard.

In embodiments, the display(s) 110 can include any suitable device for viewing information from the hazard detection server and/or the cameras 102. The display(s) 110 can comprise security monitors, liquid crystal display (LCD), computer, or other equipment that enables viewing the videos and/or images captured by the cameras 102.

The camera(s) 102 can also provide the digital image data to the hazard detection server 104. The hazard detection server 104 is configured to analyze the digital image to determine whether hazardous conditions are present in the facility. The hazard detection server 104 can include a hazard detection program including a hazard detection neural network 112 for performing the analysis of the digital image. The hazard detection server 104 can also include a messaging system 114, which can comprise a program for packaging messages and alerts to be delivered to the client device(s) 108.

In some embodiments, the hazard detection server 104 determines based on probability whether a hazardous condition is present in the digital image. In some embodiments, the hazard detection server 104 determines whether a hazardous condition is present in the digital image based on a hazard probability calculation using a machine learning module, such as the hazard neural network 112. In embodiments, the messaging system 114 can be configured to provide an alert to the client device(s) 108 according to a predetermined notification protocol when an object is identified in the digital image which has a probability of posing a hazard condition (also referred to as a confidence level) that exceeds a threshold value.

If a hazardous condition is detected, the messaging system 114 provides a warning alert to be displayed on each or a subset of the displays 110 showing images of where the hazardous condition is present. In embodiments, the warning alert is configured to contain information that identifies what the hazard condition is. In embodiments, the warning alert can also include the calculated probability value of the hazard condition being present. In embodiments, the alert message can be configured to indicate the nature of the hazard condition detected and location of the hazard condition at the location site. In embodiments, the messaging system 114 can be configured to provide an alert to the client device(s) 108 according to a predetermined notification protocol when a detected hazard has not been cleared within a given time and/or within a given area of the facility. In embodiments, the warning alert can be configured to be visually displayed on a display device and/or audibly emitted through a speaker. In embodiments, the warning alert can be configured to comprise a flashing or warning symbol to alert a worker viewing the displays 110.

The client device(s) 108 can comprise any suitable device configured to receive the alert message from the hazard detection server 104 and to display and/or emit the alert message. In embodiments, the client device(s) 108 can comprise a smart phone, a desktop computer, a laptop computer, a smart watch, a projector, an audio speaker, etc.

In embodiments, the client device(s) 108 and the hazard detection server 104 are computing devices with one or more non-transitory computer readable media, one or more central processing units (CPUs), and one or more network interfaces. The network interfaces can be configured to support wired, wireless, or a combination of both.

The hazard detection server 104 can be configured to store information in the database(s) 106 related to analysis performed on the digital image feed obtained from the camera(s) 102. In embodiments, when a hazardous condition is determined to be present based upon the hazard probability calculated by the hazard detection server 104, the hazard detection server 104 can be configured to generate a hazard condition log entry which is stored in the database(s) 106. In embodiments, the hazard condition log entry can include any suitable information, such as one or more of: the calculated hazard probability, the type of hazard, the digital image associated with the hazard, and an urgency level of the hazard.

In embodiments, the hazard detection server 104 can be used to monitor different location sites. In embodiments, the hazard detection server 104 can be configured to generate a hazard condition log entry that includes an identification of the location site at which the hazard condition occurred. In embodiments, the client device(s) 108 can retrieve information stored by the hazard detection server 104 in the database(s) 106, such as the hazardous condition events of one or more facilities and historical trend data.

The hazard detection server 104 can be configured to monitor for a variety of hazard conditions as will be appreciated by one skilled in the art. For example, in embodiments, the type of hazard condition for which the hazard detection server 104 monitors can comprise: a slip and trip hazard (e.g., spilled liquid on a floor surface), an obstructed doorway hazard, an obstructed fire/safety equipment hazard, and/or a missing safety equipment hazard (e.g., a fire extinguisher or personal protective equipment, such as a hard hat or safety vest). The hazard detection server 104 can be configured to identify whether one or more objects are either present or absent in the digital image feed received from the camera(s) to determine whether a hazardous condition exists.

In embodiments where the hazard detection server 104 is configured to monitor for a variety of hazard conditions, the hazard conditions can be arranged in different urgency levels depending on the facility. For example, in a restaurant, a slip and trip hazard may be placed at a higher priority than an obstructed doorway hazard since a customer tripping and injuring himself may disrupt business practices, closing off an area in the restaurant, especially if it is unsafe to move the customer before emergency personnel arrive.

Figure 2:
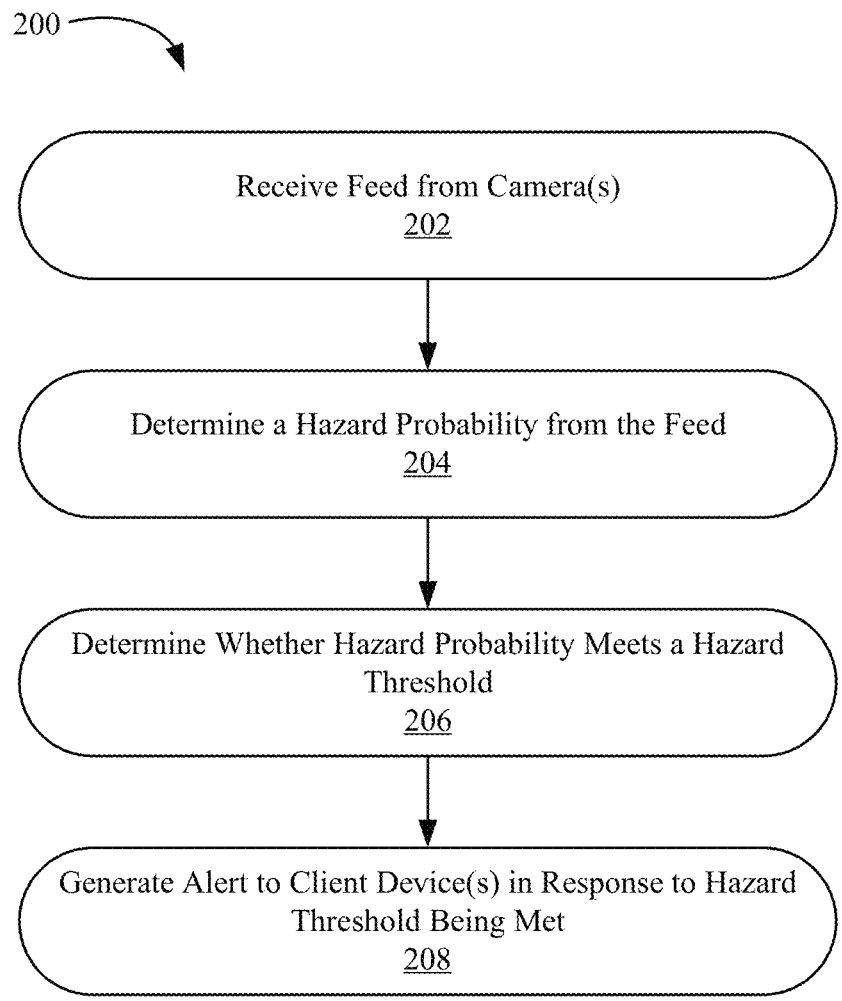
FIG. 2 is a flow diagram illustrating steps of alerting client device(s) when a hazard is detected according to an embodiment of the present disclosure.

FIG. 2 is a flow diagram illustrating steps of alerting client device(s) 108 when a hazard is detected according to an embodiment of the disclosure. The hazard detection server 104 receives feed from cameras 102 (step 202). The feed can be received at regular intervals at a specific frame rate. For example, the cameras 102 can store a series of images obtained every second, and provide the series of images to the hazard detection server 104 every 30 seconds. In some cases, the images obtained by the cameras 102 are provided to the hazard detection device 104 in real time.

The hazard detection server 104 determines a hazard probability from the digital image feed received from the camera(s) 102 (step 204). In an embodiment, the hazard detection server 104 extracts one or more features (or "objects") present in the digital image feed obtained from the cameras 102. For example, the hazard detection server 104 can be configured to identify fire/safety equipment in the series of images from the cameras 102. The hazard detection server 104 can be configured to identify other objects in the series of images, and based on a distance between the other objects and the fire/safety equipment, determine a probability of whether the fire/safety equipment is being obstructed by one or more objects identified within the other objects.

In an embodiment, the hazard detection server 104 extracts features present in the series of images obtained from the cameras 102. For example, the hazard detection server 104 can be configured to identify objects within the images and a pathway that is to be free of objects. The hazard detection server 104 can then calculate a probability of whether there are objects within the pathway. For example, the hazard detection server 104 can utilize objects extracted from images obtained by an infrared camera to determine a probability associated with a liquid in the pathway. The hazard detection server 104 can also utilize objects extracted from the images from the cameras 102 to determine a probability associated with one or more objects in the pathway.

In an embodiment, the hazard detection server 104 extracts features present in the series of images obtained from the cameras 102. For example, the hazard detection server 104 can be configured to identify individuals within the images. The hazard detection server 104 can be configured to include facial recognition software which uses information from the databases 106 to determine whether a certain individual is allowed in a certain area of the facility. In embodiments, the hazard detection server 104 can determine a probability associated with whether individuals in a designated geographic area are wearing designated PPE. In embodiments, the hazard detection server 104 can determine a probability associated with whether an identified individual is assigned an employment task for which PPE should be worn according to a database of employees, their assigned task, and the designated PPE. For example, the hazard detection server 104 can determine a probability associated with whether the individual is wearing a hardhat in an area of the facility in which hardhats are required to be worn.

At step 206, the hazard detection server 104 determines whether the hazard probability determined at step 204 is greater than or equal to a hazard threshold. If the hazard probability is greater than or equal to the hazard threshold, then step 208 is performed, and if not, then the hazard detection server 104 continues monitoring the feeds from the cameras 102 at step 202.

When the hazard detection server 104 determines that the hazard threshold is exceeded by the hazard probability, an alert is generated by the messaging system 114 (step 208). The alert is sent to the client devices 108. The alert can be configured to include an area within the facility where the hazard has been detected. The area within the facility is determined based on the camera that provided the image where the hazard had been detected. The alert can be configured to further indicate the type of hazard and the urgency associated with the hazard.

In an embodiment, the hazard neural network 112 performs analysis on the videos and/or series of images obtained from the cameras 102. The hazard neural network 112 is a program defining a neural network architecture for performing one or more functions associated with the hazard detection server 104. The hazard neural network 112 can be trained during a training phase to determine neural network parameters that achieve object recognition.

In an embodiment, during training phase, a collection of tagged images are stored on the database 106 or on the client device 108. For example, multiple images of fire extinguishers can be stored in database 106 with identifying information indicating that each stored image is an image of a fire extinguisher. In another example, images of hardhats may be tagged with identifying information indicating that the images are those of hard hats. The identifying information in this case is a tag associated with the image. The tagged images stored on the database 106 or on the client device 108 can be used to train the hazard neural network 112 to identify objects within the videos and/or series of images obtained from the cameras 102 in a testing phase. The identified objects are classified within some probability as being one or more of the tagged items.

In an embodiment, the tagged images are used to train the hazard neural network 112 based on the Microsoft Custom Vision Service. The hazard neural network 112 includes the Microsoft Custom Vision Service which performs object recognition based on the tags learned from the tagged images and provides probabilities of detected objects.

In embodiments, the hazard neural network 112 achieves object recognition with OpenCV (Open Source Computer Vision Library) filters combined with a Fast RCNN (recurrent convolutional neural network). In embodiments, the hazard neural network 112 achieves object recognition with YOLO (You Only Look Once) with TensorFlow.

In an embodiment, the hazard neural network 112 combines object recognition with provision of a hazard probability. For example, the hazard neural network 112 is trained with images that are tagged as hazardous during the training phase. During the testing phase, the hazard neural network 112 provides probabilities of whether test images are hazardous or not instead of providing intermediate probabilities of recognized objects. During training, the hazard neural network 112 can continually receive updated tagged images indicating hazardous and non-hazardous conditions through the database 106 or the client device 108. This way, the hazard neural network 112 operates on a feedback loop, constantly improving itself with additional tagged images uploaded to the database 106.

Figure 3:
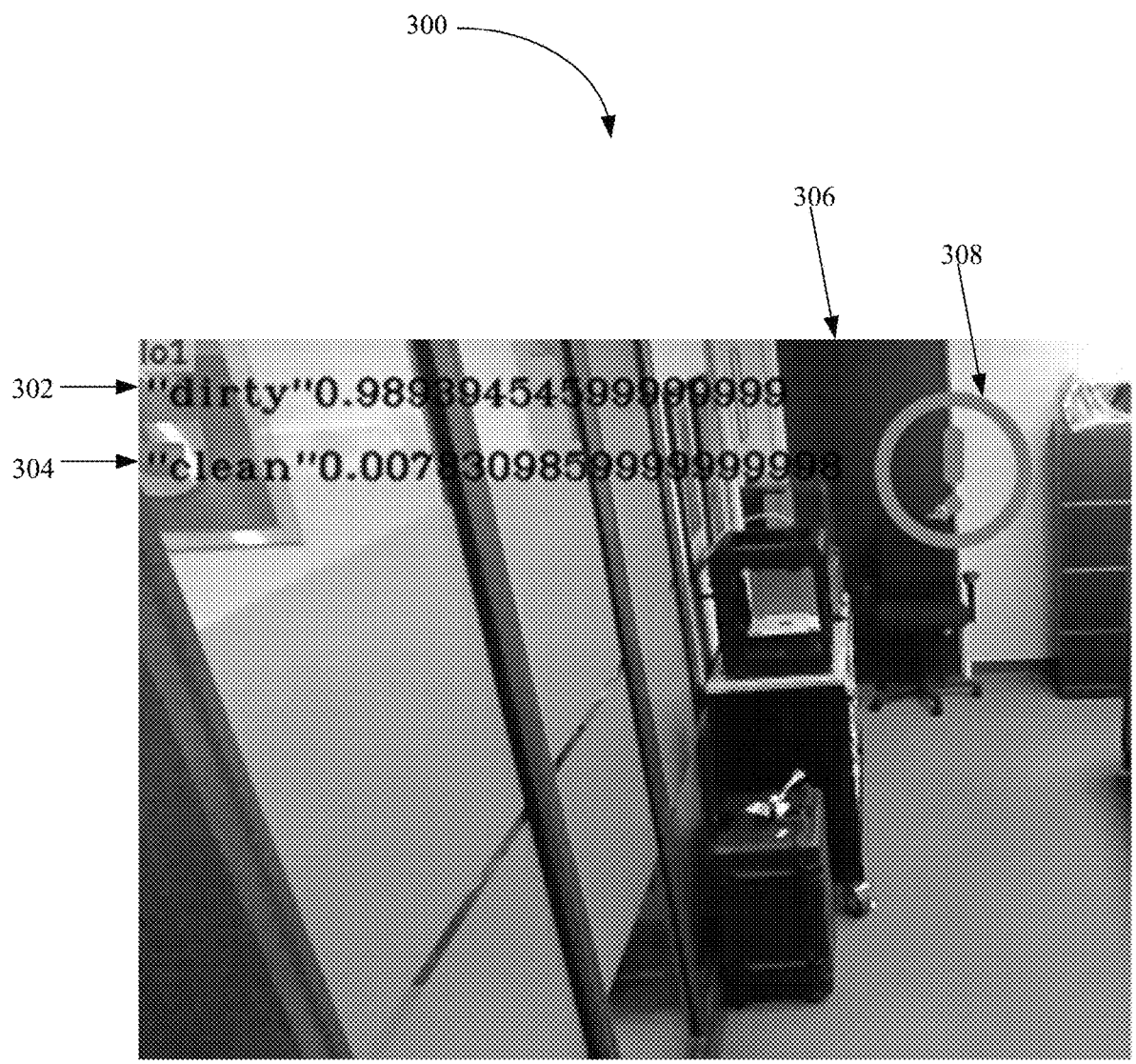
FIG. 3 is a sample screenshot of a display according to an embodiment of the present disclosure.

FIG. 3 is a sample screenshot 300 of a display, e.g., the display 110, according to an embodiment of the disclosure. The display 110 shows a camera feed of one of the cameras 102. The facility is an office space. The hazard detection server 104 identifies a door 306 being obstructed by a chair. The hazard detection server 104 calculates a hazard probability associated with the obstructed door. The hazard detection server 104 also calculates a non-hazard probability associated with the obstructed door. The hazard probability is denoted as item 302 and the non-hazard probability is denoted as item 304. The sum of both probabilities should equal one. Since the hazard probability is greater than the hazard threshold, a warning symbol 308 is displayed on the display 110 to alert an operator that a hazard is present in the current feed.

Details on hazard conditions can be sent to a cloud-based platform. For example, the databases 106 can be configured to exist in the cloud, allowing for information from one or more facilities to be accessed and shared with the client devices 108. In an embodiment, a manager responsible for two different restaurants can access hazard reports generated by the hazard detection server 104 for the two different restaurants.

In embodiments, an alert can be automatically issued by the hazard detection server 104 to a worker in a facility when a hazard has not been addressed after a predetermined time since the hazard was identified. In the event that a threshold value is met, an alert message can also be sent to a manager (e.g., via a text message or an email message).

In embodiments, the hazard detection server 104 obtains from the database 106 contact details (for alerts) and authorized worker information for a given facility. In embodiments, the client devices 108 access an application interface that is adapted to allow the facility manager to enter details and settings for how long a certain type of hazard is allowed to remain unattended. The facility manager can further indicate an escalation procedure on which workers should be alerted.

In embodiments, the system 100 includes a mobile app that is adapted to allow management to query a cloud-based console and to obtain alerts. The mobile app can be configured to perform tracing functions and to provide messages for reminding workers to regularly keep safety in mind while working. The mobile app can also warn workers of potential hazards.

The system 100 is adapted to preserve records in a data storage device for later use, such as for management reports.

In embodiments, the computing environment is adapted to allow for management reporting over multiple stores in different locations. In embodiments, the computing environment can include different reporting levels for different users (e.g., facility manager and regional executive management over a number of facilities).

Management reports can be configured by manager, location, facility or region. The data generated by the system can be used to support trend analysis over extended periods of time.

In embodiments, the computing environment includes graphical reporting capability/management dashboard features. In embodiments, the computing environment includes a security system to ensure data is protected and all user access is authenticated.

In embodiments, the computing environment includes extended access to cloud based data from a console and mobile access to also export through an API (Application Program Interface). The stored data can be imported into spreadsheets or other programs. Real time data reporting and alerts can be collected and displayed in a useful format, data feeds can be made available. Customizations can be made to provide roll up reporting of facility data.

Figure 4:
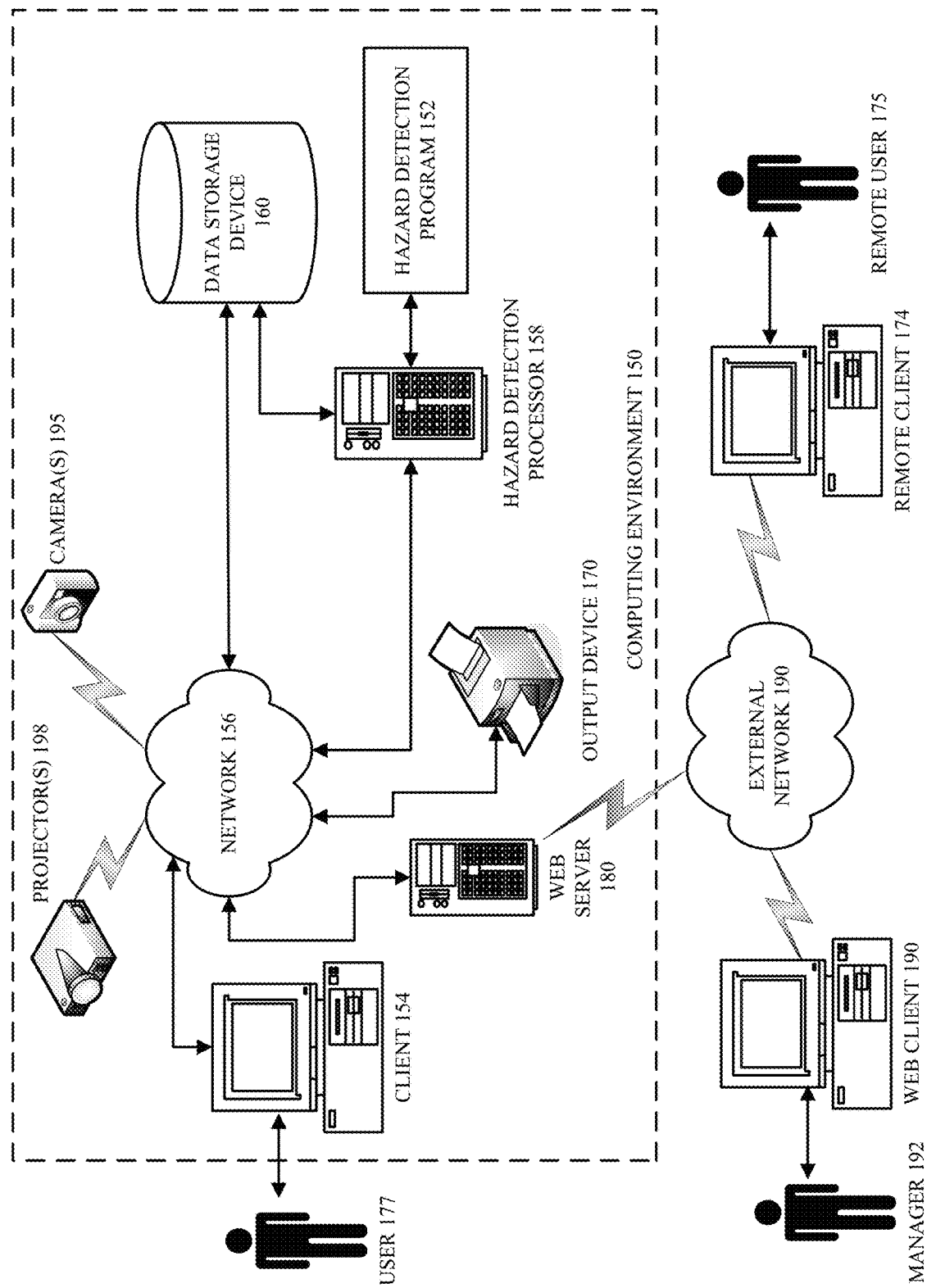
FIG. 4 is a schematic diagram of an embodiment of a computer-implemented system for detecting hazardous conditions in a facility constructed according to principles of the present disclosure.

Referring to FIG. 4, an embodiment of a computing environment 150 is shown that includes a hazard detection program 152 constructed according to principles of the present disclosure that includes a machine learning module. The illustrated computing environment 150 can include a client 154, an internal network 156, at least one hazard detection processor 158 operating the hazard detection program 152, a data storage device 160, an output device 170, a web server 180 operatively connected to the external network 190, the camera(s) 195, and at least one projector 198. The client 154, the hazard detection processor 158, the data storage device 160, the output device 170, the web server 180, the camera(s) 195, and the projector(s) 198 are operatively connected together via the internal network 156. The hazard detection processor 158 is in operable arrangement with the computer-readable medium containing the hazard detection program 152. The data storage device 160 is in operable arrangement with the hazard detection processor 158. In the illustrated embodiment, a manager 192 (either located at a facility or at an offsite location) can be in communication with the computing environment 150 via an external network 190.

In the illustrated embodiment, at least one imaging device in the form of a camera 195 located at the facility can communicate with the computing environment 150 via the network 156. The imaging device 195 is configured to generate a digital image of a region of the location site. In embodiments, any suitable imaging device can be used. For example, in embodiments, the imaging device comprises a digital camera.

In other embodiments, the imaging device comprises a thermal camera 195 configured to generate a thermal image. In embodiments where the object used to determine whether a hazard condition exists comprises a liquid upon a surface of the location site, the hazard detection processor 158 can be configured to determine the probability the object (i.e., liquid) is present in the thermal image based upon a temperature gradient in the thermal image.

The hazard detection processor 158 is in operable arrangement with the camera(s) 195 to receive the digital image feed therefrom. In an embodiment, the network 156 is a local area network, and the camera(s) 195 in communication with the hazard detection processor 158 via the network 156 can take advantage of higher transmission speeds by providing higher quality videos and/or images to the hazard detection processor 158. In an embodiment, the network 156 is a private network and the cameras 195 reside on the same network as the hazard detection processor 158 (as shown in FIG. 4) for improved security. In other embodiments with lower security constraints, the imaging device can be in the form of a low-resolution camera communicatively arranged with the hazard detection processor 158 via the external network 190.

The hazard detection program 152 can be stored on a non-transitory, tangible computer-readable medium. The computing environment 150 constitutes a computer-implemented system for detecting hazardous conditions in at least one facility. In embodiments, the hazard detection processor 158 can receive data from cameras 195 deployed at a variety of locations distributed over a larger geographic region. The computing environment 150 can include a number of computer systems, which generally can include any type of computer system based on: a microprocessor, a mainframe computer, a digital signal processor, a portable computing device, a personal organizer, a device controller, or a computational engine within an appliance. In some embodiments, the computer environment 150 is implemented in one or more electronic devices that are located in one or more locations.

The hazard detection processor 158 is in operable arrangement with the non-transitory computer-readable medium and is configured to execute the hazard detection program 152 contained thereon. The web-enabled interface 180 is communicatively arranged with the hazard detection processor 158 and the data storage device 160 to exchange information therewith.

The hazard detection processor 158 can be specially programmed with the hazard detection program 152 to detect hazards at one or more facilities and to issue an alert to the manager 192 in the event that image processing of the digital image data generated by the camera(s) 195 indicates the probability of the existence of a hazard condition that exceeds a predetermined threshold.

The projector 195 is in operable arrangement with the hazard detection processor 158 to receive a command signal therefrom. The hazard detection processor 158 can be programmed to transmit the command signal when it calculates the probability of the existence of a hazard condition that exceeds a predetermined threshold. The projector 195 is configured to project an illumination in response to receiving the command signal. In embodiments, any suitable projector can be used. In embodiments, the projector 195 can be positionably controlled via the hazard detection processor 158 to adjust the location of the illumination projected by the projector 195 such that the illumination can be projected near the location of the hazard condition as determined by the hazard detection processor 158.

At least one web client 190 can use the external network 190 to interface with the computing environment 150 via the web server 180. For example, a manager 192 can use the web client 190 to receive information from, and to transmit information to, the computing environment 150 about the safety requirements of a given facility. In some embodiments, a plurality of facilities can use other web client(s) to communicate with the hazard detection processor 158 over the external network 190. In other embodiments, a different communication channel can be established between the facility and the manager to transmit data to the hazard detection processor 158.

At least one remote client 174 can use the external network 190 to interface with the computing environment

150. For example, remote user 175 can use the remote client 174 to transmit information to, and receive information from, the computing environment 150. In an embodiment, the information transmitted to and received from the remote user 175 is training data for the machine learning module of the hazard detection program 152. That is, when the hazard detection processor 158 is unable to determine whether an image and/or video is hazardous or not, the image and/or video can be sent to the remote user 175 via the remote client 174. The remote user 175 can then classify the image and/or video as hazardous and provide the hazard detection processor 158 with a tagged image and/or video indicating its classification. The hazard detection processor 158 can then use the tagged image and/or video to update the machine learning module of the hazard detection program 152 and neural network parameters stored in the data storage device 160. In an example, a consultant or clientele of the manager 192 are remote users that provide corrective measures (tagged images), allowing the hazard detection processor 158 to train the hazard neural network of the hazard detection program 152.

The client 154 can be used to communicate with an authorized user 177, for example, to enter settings for the hazard detection processor 158 which can include setting various probability thresholds and urgencies associated with various hazards. The client 154 can comprise at least one input device. The client 154 can generally include any node on a network including computational capability and including a mechanism for communicating across the network 156.

In one embodiment, the client 154 hosts an application front end of the hazard detection program 152. The application front end can generally include any software component that can receive input from the user 177 or the client 154, communicate the input to the hazard detection program 152, receive output from the hazard detection program 152, and present the output to the user 177 and/or the client 154. In one embodiment, the application front end can be a stand-alone system.

The network 156 can generally include any type of wired or wireless communication channel capable of coupling together computing nodes. Examples of a suitable network 156 include, but are not limited to, a local area network, a wide area network, or a combination of networks.

The hazard detection processor 158 is in operable arrangement with the non-transitory, computer readable medium upon which the hazard detection program 152 is stored so as to be able to operate the program 152. In the illustrated embodiment, the hazard detection processor 158 is configured to execute the hazard detection program 152 contained on the computer-readable medium using neural network parameters stored on the data storage device 160. The hazard detection processor 158 can generally include any computational node including a mechanism for servicing requests from a client for computational resources, data storage resources, or a combination of computational and data storage resources. Furthermore, the hazard detection processor 158 can generally include any system that can host the hazard detection program 152. The hazard detection processor 158 can generally include any component of an application that can receive input from the web client(s) 190 via the web server 180 and from the client 154 through the network 156, process the input, and present the output to the hazard detection program 152, the client 154, the web server 180, and/or the data storage device 160. The hazard detection processor 158 can generally include any component of an application that can process data, interact with the data storage device 160, and execute logic for the hazard detection program 152.

The hazard detection program 152 comprises a computer program product residing on a non-transitory, tangible computer readable medium having a plurality of instructions stored thereon which, when executed by the hazard detection processor 158, cause the hazard detection processor 158 to perform steps associated with an embodiment of a method of detecting a hazard at a location site following principles of the present disclosure. The hazard detection program 152 can be any suitable computer-implemented application for processing information exchanged with the client 154; the web clients 174, 190 via a web platform such as those known to one of ordinary skill in the art; the camera(s) 195, and the projector(s) 198. The hazard detection program 152 can contain computer executable instructions adapted to exchange information in the form of data with the data storage device 160. The hazard detection program 152 can include a graphical user interface which can facilitate the input of training data and other settings into the hazard detection program 152 and the display of hazard detection information generated or used by the hazard detection program 152.

In embodiments, the hazard detection program includes an imaging processor module, a machine learning module, a notification module, and a tracking module.

The imaging processor module is configured to analyze the digital image from the imaging device to determine whether a hazard condition is present in the digital image by determining a probability that an object is present in the digital image. In embodiments, the object comprises any suitable item or set of items that can be used to identify a hazardous condition either by the object's presence or absence. In embodiments, the object comprises an item blocking a pathway (e.g., a blocked exit of the location site), and the hazard condition exists when the hazard detection program 152 determines the probability that the object is in the digital image exceeds a predetermined threshold. In embodiments, the object comprises safety equipment, and the hazard condition exists when the hazard detection program 152 determines the probability that the object is not present in the digital image exceeds a predetermined threshold. In embodiments, the safety equipment can comprise any suitable safety equipment as will be appreciated by one skilled in the art, such as a fire extinguisher, for example. In embodiments, the object comprises a person not wearing a type of personal protective equipment (e.g., a respirator, eye protection, ear protection, gloves, a hardhat, safety footwear, a safety vest, a safety harness, etc.). In embodiments, the object comprises at least one of a blocked exit of the location site and a person not wearing a type of personal protective equipment.

The machine learning module can be configured to calculate the probability of the hazard condition being present in the digital image feed. In embodiments, the machine learning module can be any suitable configuration that is constructed to perform analysis on the digital image feed received from the camera(s) 195 to determine the probability that a hazard condition exists (either by the presence or the absence of the object in the digital image feed). In embodiments, the machine learning module comprises a hazard neural network program defining a neural network architecture for performing one or more functions associated with processing the digital image to determine whether at least one object is present therein and to determine the probability that the hazard condition exists. In embodiments, the hazard neural network can be trained using techniques as will be appreciated by one skilled in the art during a training phase to determine neural network parameters that achieve object recognition.

The notification module is configured, in response to the imaging processor module determining the probability exceeds a threshold, to send an electronic alert message to at least one recipient. The electronic alert message is configured to alert the recipient that the hazard condition is present at the location site according to the digital image. In embodiments, the digital image is linked to the electronic alert message.

The notification module is configured to send the command signal to project the illumination in response to the imaging processor module determining the hazard condition is present in the digital image. In embodiments, the illumination comprises a warning message containing indicia configured to identify a hazard posed by the object. In embodiments, the command signal includes geolocation information relating to the location of the hazard condition at the location site, and the projector is configured to project the illumination message near the hazard condition based upon the geolocation information.

The tracking module is configured, in response to the imaging processor module determining the hazard condition is present in the digital image, to generate and store in memory a hazard condition log. In embodiments, the hazard condition log includes at least one of a time entry indicating when the hazard condition occurred and a location entry indicating where at the location site the hazard condition occurred.

The architecture solution of the hazard detection program 152 is flexible and scalable to include additional information for different facilities and to include additional hazardous condition information requirements for the various facilities. In embodiments, the hazard detection program 152 includes other modules and computer-executable instructions adapted to carry out other steps and features of a method of detecting hazardous conditions in a facility following principles of the present disclosure. Any suitable computer-readable storage medium can be utilized for the floor condition tracking program 152, including, for example, hard drives, floppy disks, CD-ROM drives, tape drives, zip drives, flash drives, optical storage devices, magnetic storage devices, and the like.

The data storage device 160 is in operable arrangement with the hazard detection processor 158. The database or data storage device 160 can generally include any type of system for storing data in non-volatile storage. This includes, but is not limited to, systems based upon: magnetic, optical, and magneto-optical storage devices, as well as storage devices based on flash memory and/or battery-backed up memory.

In embodiments, the data storage device 160 includes a data store, architecture, and structure that are adapted to support the hazard detection program 152. The data store can be configured to store training data for the neural network and historical hazard event log trending data. In embodiments, the data store allows for data analytics processes of the hazard detection program 152 to generate hazard event analyses.

In embodiments, the data storage device 160 houses a database of training images. The training images are used for training the machine learning module to detect the object. In embodiments, the training images comprise digital images tagged to indicate whether the object is found therein. In embodiments, the training images containing the object have a polygon identifier around the object.

In embodiments, the training images comprise digital images captured at a location other than the location site. For example, in embodiments, the database of training images can be populated using publicly-available images from a variety of location sites other than the location site being monitored. These offsite location images can be tagged and annotated for purposes of training the neural network.

In embodiments, the training images comprise digital images captured at the location site. In embodiments, the data storage device 160 housing the database of training images captured at the location site is maintained at the location site itself. This arrangement can help enhance the secured storage of these onsite training images.

In embodiments, the data storage device 160 can store a data warehouse that comprises a collection of databases (e.g., Access, SQL). For example, the data storage device 160 can contain a permission database which stores user credentials and permissions specific to active users 177, remote users 175, managers 192, and others that interact with the computing environment 150.

The output device 170 can comprise a printer, a display monitor, and a connection to another device, for example. The output device 170 can be used to generate reports for sending to the manager 192 and/or each facility. The output device 170 can be used to communicate to the user 177 information generated by the hazard detection program 152.

A report engine can be provided to generate displays of information stored in the data storage device 160 concerning the hazard conditions tracked by the system 150, which can be viewed using the output device 170, for example. In one embodiment, the report engine further provides pre-configured and/or ad hoc reports relating to the hazard conditions of each location site tracked by the system 150.

The web server 180 can provide a suitable web site or other Internet-based graphical user interface which is accessible by the manager 192, providing hazard threshold settings, for example. In other embodiments, other sites can be connected to the web-enabled interface. The web server 180 can serve as a web-enabled interface adapted to exchange information with multiple facilities including to receive digital image feeds from a given location site that is different from where the hazard detection server 158 is located, for example.

In embodiments, at least one of the web server 180 and the external network 190 is equipped with an application program interface (API) interconnected between the hazard detection processor 158 and the remote client 174 to facilitate the training of the machine learning module via training images that are stored in a cloud-based system. The API is configured to direct training input data to the hazard detection processor 158 and to direct training output data from the hazard detection processor 158 to the remote client 174 and/or the cloud-based storage repository of a database of training images.

The web server 180 can provide access to an internet-based web platform that includes the hazard detection program 152. In some embodiments, the web server 180 can be adapted to host a web site, to execute enterprise applications, to deliver web pages and other content upon request to web clients, and to receive content from web clients. The web client(s) 190 can be connected to the web server 180 through the network connection 190 (e.g., Internet, Intranet, LAN, WAN and the like). The web server 180 can use an authentication server in order to validate and assign proper permissions to authorized users of the system. A permission database can store web user credentials and permissions specific to each user, investor, agent, broker, market information source, etc. The web server 180 can be outfitted with a firewall such that requests originating from outside the computing environment 150 pass through the firewall before being received and processed at the web server 180.

In addition to the components discussed above, the computing environment 150 can further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

In yet other embodiments, the computing environment can include an electronic common repository for electronic documents relating to hazards. The electronic common repository can be used by users 177, managers 192, and others according to a set of authorized permissions to the respective party to upload electronic documents generated at different times of the process.

In other embodiments, systems and methods of detecting hazardous conditions in a facility, can be implemented on various types of computer architectures, such as for example on a single general purpose computer or workstation, on a networked system, in a client-server configuration, or in an application service provider configuration. Additionally, the methods and systems described herein can be implemented on many different types of processing devices by program code comprising program instructions that are executable by the device processing subsystem. The software program instructions can include source code, object code, machine code, or any other stored data that is operable to cause a processing system to perform methods described herein. Other implementations can also be used, however, such as firmware or even appropriately designed hardware configured to carry out the methods and systems described herein.

The systems' and methods' data (e.g., associations, mappings, etc.) can be stored and implemented in one or more different types of computer-implemented ways, such as different types of storage devices and programming constructs (e.g., data stores, RAM, ROM, flash memory, flat files, databases, programming data structures, programming variables, IF-THEN (or similar type) statement constructs, etc.). It is noted that data structures describe formats for use in organizing and storing data in databases, programs, memory, or other tangible computer-readable media for use by a computer program.

The computer components, software modules, functions, data stores and data structures described herein can be connected directly or indirectly to each other in order to allow the flow of data needed for their operations. It is also noted that a module or processor can include but is not limited to a unit of code that performs a software operation, and can be implemented, for example, as a subroutine unit of code, a software function unit of code, an object (as in an object-oriented paradigm) or an applet and can be implemented in a computer script language or another type of computer code. The software components and/or functionality can be located on a single computer or distributed across multiple computers depending upon the particular circumstances surrounding its use (e.g., located on client and/or server computers).

In various embodiments, methods of detecting hazards in a facility in accordance with principles of the present disclosure operate as software programming operating on a computer processor. Dedicated hardware implementations, including, but not limited to, application-specific integrated circuits, programmable logic arrays and other hardware devices, can likewise be constructed to implement the methods described herein. Furthermore, alternative software implementations, including, but not limited to, distributed processing or component/object distributed processing, parallel processing, or virtual machine processing, can also be constructed to implement the methods described herein.

In various embodiments, a hazard detection program 152 in accordance with principles of the present disclosure can take the form of a computer program product on a non-transitory, tangible computer-readable storage medium having computer-readable program code means embodied in the storage medium. Software implementations of the techniques for detecting hazard conditions at a facility as described herein can be stored on any suitable tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, a non-transitory, tangible storage medium includes a distribution medium and art-recognized equivalents and successor media, in which the software implementations herein are stored.

Additionally, embodiments of a hazard detection program 152 stored upon a non-transitory, computer-readable medium following principles of the present disclosure contain a plurality of instructions which, when executed by the hazard detection processor 158, cause the processor 158 to perform steps associated with detecting a hazard at a location site following principles of the present disclosure. In embodiments, the hazard detection program 152 stored upon a non-transitory, computer-readable medium can be configured to carry out any embodiment of a method of detecting a hazard at a location site following principles of the present disclosure. In embodiment, the hazard detection processor 158 is adapted to execute the programming stored upon the non-transitory computer readable medium to perform various methods, processes, and modes of operations in a manner following principles of the present disclosure.

Figure 5:
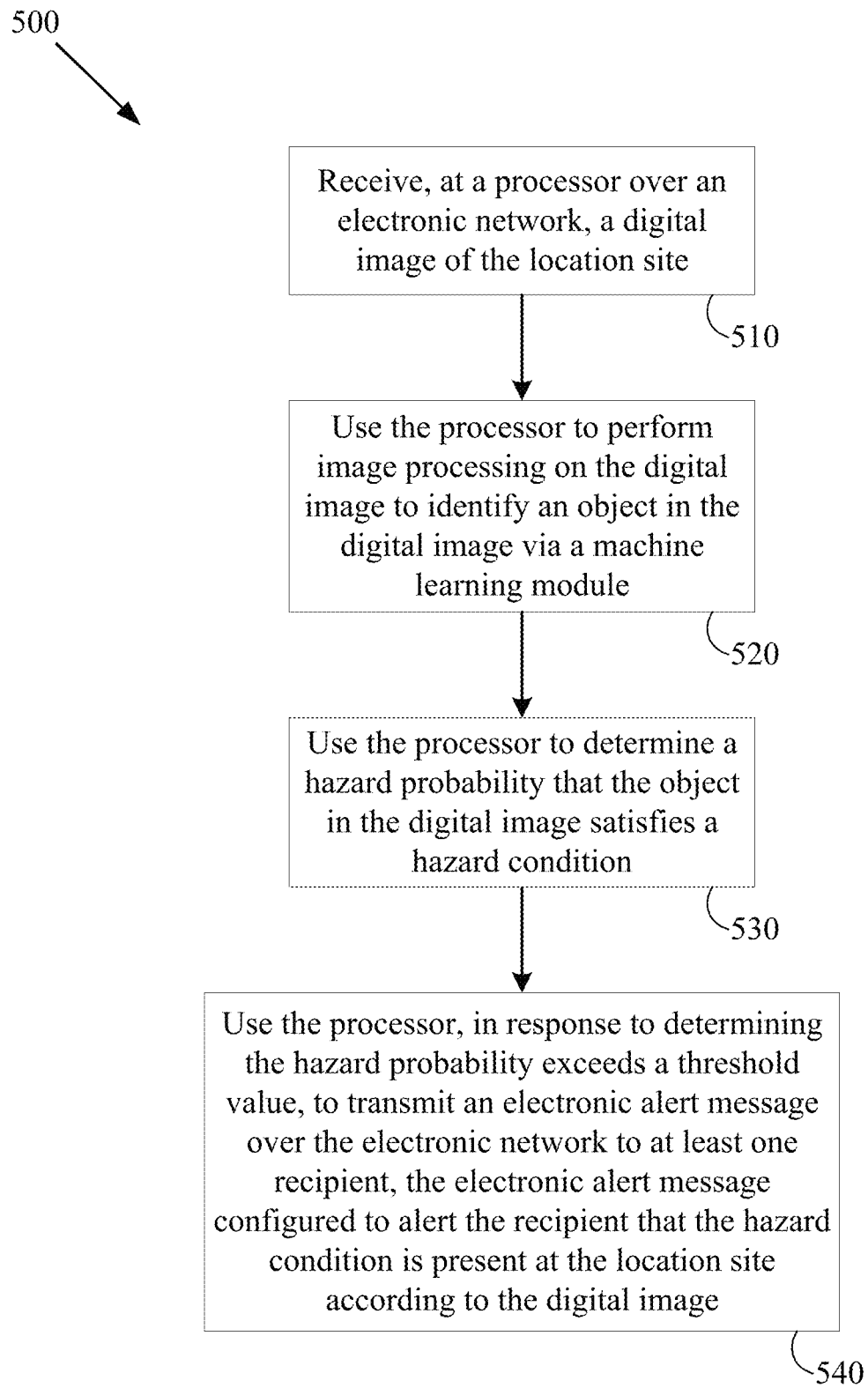
FIG. 5 is a flow diagram illustrating steps of an embodiment of a method for detecting a hazard at a location site according principles of the present disclosure.

FIG. 5 depicts a flowchart illustrating steps of an embodiment of a method 500 for detecting a hazard at a location site following principles of the present disclosure. In other embodiments, other suitable implementations of methods can be used that include these and/or other steps, as will be appreciated by one skilled in the art.

In embodiments of a method for detecting a hazard at a location site following principles of the present disclosure, a system constructed according to principles of the present disclosure can be used to carry out the method. In embodiments, a method for detecting a hazard at a location site following principles of the present disclosure includes employing a processor to execute computer executable instructions stored on a tangible computer-readable medium to analyze images from the cameras, determine probabilities of hazards being present in the images, and transmit an electronic alert over an electronic network to a predetermined recipient when the probabilities exceed a hazard threshold.

An embodiment of a method for detecting a hazard at a location site includes employing a processor to execute a hazard detection program having computer-executable instructions stored on a non-transitory computer-readable medium. The hazard detection program causes the processor to perform one or more steps as described herein.

Referring to FIG. 5, in one embodiment, a method 500 of detecting a hazard at a location site includes receiving, at a processor over an electronic network, a digital image of a region of the location site (step 510). The processor is used to execute computer executable instructions stored on a non-transitory computer-readable medium. The instructions cause the processor to perform image processing on the digital image to identify an object in the digital image via a machine learning module, determine a hazard probability that the object in the digital image satisfies a hazard condition, and, in response to determining the hazard probability exceeds a threshold value, transmit an electronic alert message over the electronic network to at least one recipient. The electronic alert message is configured to alert the recipient that the hazard condition is present at the location site according to the digital image. In embodiments of a method for detecting a hazard at a location site following principles of the present disclosure, the digital image is linked to the electronic alert message.

In embodiments of a method for detecting a hazard at a location site following principles of the present disclosure, the object comprises a liquid upon a surface of the location site. The digital image comprises a thermal image, and the processor is used to determine the probability the object is present in the thermal image based upon a temperature gradient in the thermal image.

In embodiments of a method for detecting a hazard at a location site following principles of the present disclosure, in response to determining the hazard probability exceeds the threshold value, the processor is used to execute computer executable instructions stored on the non-transitory computer-readable medium to generate and store in memory a hazard condition event in a hazard condition log. In embodiments, the hazard condition event includes at least one of a time entry indicating when the hazard condition occurred and a location entry indicating where at the location site the hazard condition occurred. In at least some of such embodiments, the processor is used to execute computer executable instructions stored on the non-transitory computer-readable medium to generate a report comprising a trend analysis using the hazard condition log. The hazard condition log can contain a plurality of hazard condition events for the location site, and the method can further include displaying, by the processor, the trend analysis in a display device via a graphical user interface.

In embodiments of a method for detecting a hazard at a location site following principles of the present disclosure, the processor can be used to execute computer executable instructions stored on the non-transitory computer-readable medium to transmit a command signal to a projector in response to determining the hazard probability exceeds the threshold value. The method can further include projecting, by the projector in response to receiving the command signal, an illumination. The illumination can comprise a warning message containing indicia configured to identify a hazard posed by the hazard condition. In at least some of such embodiments, the processor can be used to execute computer executable instructions stored on the non-transitory computer-readable medium to determine a location of the hazard condition within the location site in response to determining the hazard probability exceeds the threshold value. The command signal can include geolocation information relating to the location of the hazard condition at the location site, and the projector can be configured to project the illumination message near the hazard condition based upon the geolocation information.

In embodiments of a method for detecting a hazard at a location site following principles of the present disclosure, performing image processing on the digital image to identify the object in the digital image includes training a neural network to detect the object in the digital image and executing the neural network to detect the object in the digital image.

In embodiments of a method for detecting a hazard at a location site following principles of the present disclosure, training the neural network includes training the neural network using training images stored in a database on a data storage device comprising digital images captured at a location other than the location site.

In embodiments of a method for detecting a hazard at a location site following principles of the present disclosure, training the neural network includes training the neural network using training images stored in a database on a data storage device comprising digital images captured at the location site. In embodiments, the method includes adding the digital image to the database of the training images. The neural network can be trained via a feedback loop with the digital image. In embodiments, the method housing the data storage device at the location site.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for detecting a hazard condition at a location site, the system comprising:
    an imaging device, configured to generate a digital image of a region of the location site;
    a non-transitory computer-readable medium having stored thereon a hazard detection program and a hazard neural network;
    a processor in operable arrangement with the imaging device to receive the digital image therefrom and in operable arrangement with the non-transitory computer-readable medium, the processor configured to execute the hazard detection program contained on the non-transitory computer-readable medium,
    wherein the hazard neural network combines object recognition and hazard probability,
    wherein during a training phase, the hazard neural network is trained with digital images that are tagged as hazardous to create tagged digital images,
    wherein during the training phase, the hazard neural network receives updates of the tagged digital images indicating hazardous conditions and non-hazardous conditions as part of a feedback loop for improving the hazard neural network,
    wherein during a testing phase, the hazard neural network provides a hazard probability of whether the tagged digital images are hazardous,
    wherein the hazard detection program includes an imaging processor module configured to analyze the digital image from the imaging device to determine whether a hazard condition is present in the digital image by determining the hazard probability that an object poses a hazardous condition based on a confidence level and that the object is present in the digital image, the probability being calculated via the hazard neural network,
    wherein the hazard detection program extracts one or more features present in the digital images, wherein the one or more features are safety equipment,
    wherein the hazard detection program determines a distance between the object and the safety equipment, and based on the distance, determines an obstruction probability of whether the safety equipment is being obstructed by the object, and
    wherein the hazard detection program includes a notification module configured, in response to the imaging processor module determining the probability exceeds a threshold, to send an electronic alert message to at least one recipient, the electronic alert message configured to alert the recipient that the hazard condition is present at the location site according to the digital image, the electronic message including the hazard probability, the obstruction probability, a type of the hazard, an urgency level of the hazard and the digital image being linked to the electronic alert message such that the electronic message contains at least one of the digital image and a hyperlink to the digital image.

2. The system according to claim 1, further comprising:
    a projector in operable arrangement with the processor to receive a command signal therefrom, the projector configured to project an illumination in response to receiving the command signal;
    wherein the notification module is configured to send the command signal to project the illumination in response to the imaging processor module determining the hazard condition is present in the digital image, and wherein the illumination comprises a warning message containing indicia configured to identify a hazard posed by the object.

3. The system according to claim 1, wherein the hazard detection program includes a tracking module configured, in response to the imaging processor module determining the hazard condition is present in the digital image, to generate and store in memory a hazard condition log, the hazard condition log including at least one of a time entry indicating when the hazard condition occurred and a location entry indicating where at the location site the hazard condition occurred.

4. The system according to claim 1, wherein the object comprises at least one of an item blocking a pathway of the location site or a person not wearing a type of personal protective equipment.

5. The system according to claim 1, further comprising a data storage device housing a database of training images, the training images for training the machine learning module to detect the object.

6. The system according to claim 5, wherein the training images comprise digital images captured at a location other than the location site.

7. The system according to claim 5, wherein the data storage device housing the database of training images is located at the location site.

8. The system according to claim 5, wherein the training images comprise digital images tagged to indicate whether the object is found therein.

9. The system according to claim 8, wherein the training images containing the object have a polygon identifier around the object.

10. The system according to claim 5, wherein the training images comprise digital images captured at the site location.

11. The system according to claim 1, wherein the hazard detection program utilizes the object extracted from the digital images to determine a liquid probability of whether a liquid exists within a pathway.

12. The system according to claim 1, wherein the hazard detection program utilizes the object extracted from the digital images to determine a pathway probability of whether the object exists within a pathway.

13. The system according to claim 12, wherein the imaging device comprises a thermal camera, the thermal camera configured to generate a thermal image, the hazard detection program configured to determine a probability the object is present in the thermal image based upon a temperature gradient in the thermal image.

14. The system according to claim 13, further comprising:
    a projector in operable arrangement with the processor to receive a command signal therefrom, the projector configured to project an illumination in response to receiving the command signal;
    wherein the notification module is configured to send the command signal to project the illumination in response to the imaging processor module determining the hazard condition is present in the digital image, and wherein the illumination comprises a warning message containing indicia configured to identify a hazard posed by the object.

15. The system according to claim 14, wherein the command signal includes geolocation information relating to the location of the hazard condition at the location site, and wherein the projector is configured to project the illumination message near the hazard condition based upon the geolocation information.

16. A system, comprising:
an imaging device configured to generate a digital image of at least a region of a site location;
a processor in operable arrangement with a hazard neural network and the imaging device to receive the digital image therefrom, the processor programmed to:
during a training phase, train with digital images that are tagged as hazardous to create tagged digital images;
during the training phase, receive updates of the tagged digital images indicating hazardous conditions and non-hazardous conditions as part of a feedback loop for improving the hazard neural network,
during a testing phase, provide a hazard probability of whether the tagged digital images are hazardous,
perform image processing on the digital image to identify an object in the digital image via the hazard neural network,
determine the hazard probability that the object in the digital image satisfies a hazard condition based on a confidence level,
extract one or more features present in the digital images, wherein the one or more features are safety equipment,
determine a distance between the object and the safety equipment, and based on the distance, determine an obstruction probability of whether the safety equipment is being obstructed by the object,
in response to determining the hazard probability exceeds a threshold value, send an electronic alert message to at least one recipient, the electronic alert message configured to alert the recipient that the hazard condition is present at the location site according to the digital image;
a projector in operable arrangement with the processor to receive a command signal therefrom, the projector configured to project an illumination in response to receiving the command signal;
wherein the processor is programmed to transmit the command signal in response to determining the hazard probability exceeds the threshold value, and wherein the illumination comprises a warning message containing indicia configured to identify a type of the hazard posed by the object, the hazard probability, the obstruction probability, and an urgency level of the hazard.

17. A method for detecting a hazard at a location site, the method comprising:
receiving, at a processor in operable arrangement with a hazard neural network, a digital image of a region of the location site;
using the processor to execute computer executable instructions stored on a non-transitory computer-readable medium to:
during a training phase, train with digital images that are tagged as hazardous to create tagged digital images;
during the training phase, receive updates of the tagged digital images indicating hazardous conditions and non-hazardous conditions as part of a feedback loop for improving the hazard neural network,
during a testing phase, provide a hazard probability of whether the tagged digital images are hazardous,
perform image processing on the digital image to identify an object in the digital image via the hazard neural network,
determine the hazard probability that the object in the digital image satisfies a hazard condition based on a confidence level,
extract one or more features present in the digital images, wherein the one or more features are safety equipment,
determine a distance between the object and the safety equipment, and based on the distance, determine an obstruction probability of whether the safety equipment is being obstructed by the object,
link the digital image to the electronic alert message such that the electronic alert message contains, the hazard probability, the obstruction probability, a type of the hazard, an urgency level of the hazard and at least one of the digital image and a hyperlink to the digital image.

18. The method according to claim 17, wherein the object comprises a liquid upon a surface of the location site, wherein the digital image comprises a thermal image, and wherein the processor is used to determine a probability the object is present in the thermal image based upon a temperature gradient in the thermal image.

19. The method according to claim 17, wherein, in response to determining the hazard probability exceeds the threshold value, the processor is used to execute computer executable instructions stored on the non-transitory computer-readable medium to generate and store in memory a hazard condition event in a hazard condition log, the hazard condition event including at least one of a time entry indicating when the hazard condition occurred and a location entry indicating where at the location site the hazard condition occurred.

20. The method according to claim 19, wherein the processor is used to execute computer executable instructions stored on the non-transitory computer-readable medium to generate a report comprising a trend analysis using the hazard condition log, the hazard condition log containing a plurality of hazard condition events for the location site, the method further comprising:
displaying, by the processor, the trend analysis in a display device via a graphical user interface.

21. The method according to claim 17, wherein the processor is used to execute computer executable instructions stored on the non-transitory computer-readable medium to transmit a command signal to a projector in response to determining the hazard probability exceeds the threshold value, the method further comprising:
projecting, by the projector in response to receiving the command signal, an illumination, the illumination comprises a warning message containing indicia configured to identify a hazard posed by the hazard condition.

22. The method according to claim 21, wherein the processor is used to execute computer executable instructions stored on the non-transitory computer-readable medium to determine a location of the hazard condition within the location site in response to determining the hazard probability exceeds the threshold value, and wherein the command signal includes geolocation information relating to the location of the hazard condition at the location site, and wherein the projector is configured to project the illumination message near the hazard condition based upon the geolocation information.

23. The method according to claim 17, wherein performing image processing on the digital image to identify the object in the digital image includes training a neural network to detect the object in the digital image and executing the neural network to detect the object in the digital image.

24. The method according to claim 23, wherein training the neural network includes training the neural network using training images stored in a database on a data storage device comprising digital images captured at a location other than the location site.

25. The method according to claim 23, wherein training the neural network includes training the neural network using training images stored in a database on a data storage device comprising digital images captured at the location site.

26. The method according to claim 25, further comprising adding the digital image to the database of the training images.

27. The method according to claim 25, further comprising housing the data storage device at the location site.

* * * * *